(12) United States Patent
Ansari et al.

(10) Patent No.: US 11,692,143 B1
(45) Date of Patent: Jul. 4, 2023

(54) CRUDE OIL DEMULSIFICATION

(71) Applicant: Saudi Arabian Oil Company, Dhahran (SA)

(72) Inventors: Nisar Ahmad Ansari, Ras Tanura (SA); Mohamed Ahmed Soliman, Ras Tanura (SA)

(73) Assignee: Saudi Arabian Oil Company, Dhahran (SA)

(*) Notice: Subject to any disclaimer, the term of this patent is extended or adjusted under 35 U.S.C. 154(b) by 2 days.

(21) Appl. No.: 17/645,175

(22) Filed: Dec. 20, 2021

(51) Int. Cl.
| | |
|---|---|
| C10G 33/02 | (2006.01) |
| B01D 19/00 | (2006.01) |
| B01D 17/06 | (2006.01) |
| C10G 33/08 | (2006.01) |
| B01D 17/12 | (2006.01) |
| B01D 17/02 | (2006.01) |

(52) U.S. Cl.
CPC ......... *C10G 33/02* (2013.01); *B01D 17/0214* (2013.01); *B01D 17/06* (2013.01); *B01D 17/12* (2013.01); *B01D 19/0057* (2013.01); *C10G 33/08* (2013.01)

(58) Field of Classification Search
CPC ..... C10G 33/02; B01D 17/06; B01D 19/0057
See application file for complete search history.

(56) References Cited

U.S. PATENT DOCUMENTS

| | | |
|---|---|---|
| 4,180,457 A | 12/1979 | Popp et al. |
| 4,948,393 A | 8/1990 | Hodson et al. |
| 5,643,469 A | 7/1997 | Prevost et al. |
| 6,136,174 A | 10/2000 | Berry et al. |
| 7,140,441 B2 | 11/2006 | Hauge et al. |
| 7,455,109 B2 | 11/2008 | Collins |

(Continued)

FOREIGN PATENT DOCUMENTS

| | | |
|---|---|---|
| CN | 201735213 | 2/2011 |
| CN | 104531204 | 4/2015 |

(Continued)

OTHER PUBLICATIONS

Devold, "Oil and gas production handbook: An introduction to oil and gas production, transport, refining and petrochemical industry," ABB, Edition 3.0 Oslo, Aug. 2013, 162 pages.

(Continued)

*Primary Examiner* — Brian W Cohen
(74) *Attorney, Agent, or Firm* — Fish & Richardson P.C.

(57) ABSTRACT

A crude oil demulsification system includes a vessel. A cyclonic separator is disposed outside the vessel. The cyclonic separator is configured to receive and separate phases of a multi-phase fluid stream into a gaseous stream and a liquid stream that includes a first liquid phase and a second liquid phase by inducing cyclonic flow. A heat exchanger is fluidically connected to the cyclonic separator. The heat exchanger is disposed outside the vessel, and is configured to receive the liquid stream and to heat the liquid stream by exchanging heat with a heating medium flowed through the heat exchanger. An electrostatic coalescer is fluidically connected to the heat exchanger and is disposed inside the vessel. The electrostatic coalescer is configured to receive the liquid stream heated by the heat exchanger and to demulsify the liquid stream by causing coalescence of liquid droplets of one of the first or second liquid phases.

21 Claims, 7 Drawing Sheets

(56) References Cited

U.S. PATENT DOCUMENTS

| | | | |
|---|---|---|---|
| 8,573,306 | B2 | 11/2013 | Donald et al. |
| 8,790,509 | B2 | 7/2014 | Vu |
| 9,975,789 | B2 | 5/2018 | Ghasripoor et al. |
| 10,329,171 | B2 | 6/2019 | Henthorne |
| 10,648,314 | B2 | 5/2020 | Unnam et al. |
| 11,161,059 | B2 | 11/2021 | Soliman et al. |
| 2003/0150324 | A1 | 8/2003 | West |
| 2004/0144256 | A1 | 7/2004 | Mazzei |
| 2007/0267325 | A1 | 11/2007 | Vu |
| 2009/0159426 | A1* | 6/2009 | Chen ............... C10G 33/02 422/186.04 |
| 2011/0139625 | A1 | 6/2011 | Arntzen et al. |
| 2013/0312614 | A1* | 11/2013 | Zainal Abidin ........ B01D 45/08 96/242 |
| 2015/0014258 | A1 | 1/2015 | Whitney et al. |
| 2015/0122654 | A1 | 5/2015 | Beg et al. |
| 2017/0173499 | A1 | 6/2017 | Sprenkel et al. |
| 2017/0175008 | A1* | 6/2017 | Sprenkel ............ B01D 19/0036 |
| 2018/0370834 | A1 | 12/2018 | Sutton-Sharp |
| 2019/0063203 | A1* | 2/2019 | Arefjord ............... B01D 17/00 |
| 2020/0398191 | A1 | 12/2020 | Soliman et al. |
| 2020/0398192 | A1 | 12/2020 | Soliman et al. |

FOREIGN PATENT DOCUMENTS

| | | |
|---|---|---|
| CN | 103695029 | 8/2016 |
| CN | 106590731 | 4/2017 |
| CN | 107723020 | 2/2018 |
| EP | 2497556 | 9/2012 |
| JP | 2012250200 | 12/2012 |

OTHER PUBLICATIONS

Manning and Thompson, "Oilfield Processing," Chapter 8, vol. 2, Pennwell Publishing Co, 1995, 14 pages.

Piasecki et al., "Vessel Internal Electrostatic Coalescer (VIEC)," ABB Review, Apr. 2004, 4 pages.

GCC Examination Report in Gulf Cooperation Council Appln. No. GC 2020-39954, dated Aug. 19, 2021, 4 pages.

PCT International Search Report and Written Opinion issued in International Application No. PCT/US2020/039353 dated Sep. 1, 2020, 13 pages.

* cited by examiner

CRUDE OIL DEMULSIFICATION

TECHNICAL FIELD

This disclosure relates to separation of fluids, for example, crude oil emulsions.

BACKGROUND

Crude oil from a subterranean formation typically includes water with salt. If the water is not separated from the crude oil, the salt content can cause corrosion and deposition of salts in downstream equipment (such as pipelines and heat exchangers). It can be beneficial to demulsify the crude oil to separate the oil and water phases. Three example factors associated with crude oil demulsification include the rate at which the oil and water phases separate, the amount of water left in the crude oil after separation, and the quality of the separated water for treatment and/or disposal.

SUMMARY

This disclosure describes technologies relating to separation of fluids, and more specifically, demulsification of crude oil. Certain aspects of the subject matter described can be implemented as a system. The system includes a device disposed within a storage tank. The device includes a cyclonic separator and an electrostatic coalescer. The cyclonic separator is configured to receive and separate phases of a multi-phase fluid stream. The cyclonic separator is configured to induce cyclonic flow of the multi-phase fluid stream to separate the multi-phase fluid stream into a gas stream and a liquid stream. The liquid stream includes a first liquid phase and a second liquid phase. The cyclonic separator is configured to discharge at least a portion of the gas stream and at least a portion of the liquid stream. The electrostatic coalescer is downstream of and fluidically connected to the second outlet of the cyclonic separator. The electrostatic coalescer is configured to demulsify the liquid stream by causing coalescence of liquid droplets of one of the first or second liquid phases.

This, and other aspects, can include one or more of the following features.

The cyclonic separator can include an inlet for flowing the multi-phase fluid stream into the cyclonic separator. The inlet can be configured to induce cyclonic flow of the multi-phase fluid stream in the cyclonic separator. The inlet can be disposed tangentially to a circumference of the cyclonic separator. The cyclonic separator can include a first outlet for discharging at least the portion of the gas stream. The cyclonic separator can include a second outlet for discharging at least the portion of the liquid stream.

The electrostatic coalescer can include a housing configured to discharge coalesced liquid droplets to the storage tank.

The housing can include a tubular with an open end for discharging the coalesced liquid droplets to the storage tank.

The electrostatic coalescer can include multiple electrodes disposed within the housing. The electrostatic coalescer can include a power supply connected to the electrodes. The electrodes can be configured to produce an electric field in response to receiving power from the power supply.

Certain aspects of the subject matter described can be implemented as a method. Within a storage tank, cyclonic flow is caused in a multi-phase fluid stream through a cyclonic separator. Within the storage tank, the multi-phase fluid stream is separated into a gas stream and a liquid stream. The liquid stream includes an emulsion of oil and water. Within the storage tank, the water in the emulsion is electrostatically coalesced.

This, and other aspects, can include one or more of the following features.

The liquid stream can be flowed from the cyclonic separator to an electrostatic coalescer.

The gas stream can be flowed from the cyclonic separator into a vapor space of the storage tank through a first outlet of the cyclonic separator. The droplets of water and the oil can be discharged from the electrostatic coalescer to the storage tank.

Electrostatically coalescing the water in the liquid stream can include supplying power to an electrode of the electrostatic coalescer.

Flowing the liquid stream from the cyclonic separator to the electrostatic coalescer can include flowing the liquid stream through a second outlet of the cyclonic separator to the electrostatic coalescer.

The cyclonic separator and the electrostatic coalescer can be disposed within the storage tank.

The second outlet of the cyclonic separator can be connected to the electrostatic coalescer.

Certain aspects of the subject matter described can be implemented as a system. The system includes a storage tank and a device disposed within the storage tank. The device includes a cyclonic separator and an electrostatic coalescer. The cyclonic separator is configured to receive and separate a multi-phase fluid stream into a gas stream and a liquid stream. The cyclonic separator includes a conical housing, an inlet, and a tubular. The conical housing includes a first end, a second end smaller than the first end, and a lateral surface between the first end and the second end. The first end, the second end, and the lateral surface define an inner volume of the cyclonic separator. The inlet is disposed tangentially to a circumference of the lateral surface of the conical housing. The inlet is configured to receive the multi-phase fluid stream. The tubular penetrates the first end of the conical housing and extends into the inner volume of the cyclonic separator. The tubular is configured to discharge at least a portion of the gas stream from the cyclonic separator. The second end of the conical housing is configured to discharge at least a portion of the liquid stream from the cyclonic separator. The electrostatic coalescer is downstream of and fluidically connected to the second end of the conical housing. The electrostatic coalescer is configured to cause coalescence of liquid droplets in the portion of the liquid stream. The electrostatic coalescer includes a housing, a power supply, and multiple electrodes disposed within the housing. The housing includes an open end configured to discharge the coalesced liquid droplets of the portion of the liquid stream to the storage tank. The electrodes are connected to the power supply. The electrodes are configured to produce an electric field in response to receiving power from the power supply.

Certain aspects of the subject matter described here can be implemented as a system that includes a vessel. A cyclonic separator is disposed outside the vessel. The cyclonic separator is configured to receive and separate phases of a multi-phase fluid stream. The cyclonic separator is configured to induce cyclonic flow of the multi-phase fluid stream to separate the multi-phase fluid stream into a gaseous stream and a liquid stream that includes a first liquid phase and a second liquid phase. The cyclonic separator is configured to discharge at least a portion of the gaseous stream and at least a portion of the liquid stream. A heat exchanger is fluidically connected to the cyclonic separator. The heat exchanger is disposed outside the vessel, and is configured to receive the liquid stream and to heat the liquid stream by exchanging heat with a heating medium flowed through the heat exchanger. An electrostatic coalescer is fluidically connected to the heat exchanger and is disposed inside the vessel. The electrostatic coalescer is configured to receive the liquid stream heated by the heat exchanger and to demulsify the liquid stream by causing coalescence of liquid droplets of one of the first or second liquid phases.

An aspect combinable with any other aspect includes the following features. A temperature control subsystem is connected to the heat exchanger and disposed outside the vessel. The temperature control subsystem includes a temperature sensor and a temperature controller coupled to the temperature sensor. The temperature sensor is installed in a flow path of the heating medium, and is configured to sense a temperature of the heating medium and to transmit the sensed temperature. The temperature controller receives the sensed temperature from the temperature sensor and compares the sensed temperature with a reference temperature. Based on a result of the comparing, the temperature controller causes operation of a temperature control valve that is disposed in the flow path of the heating medium and is configured to control a quantity of the heating medium flowed through the heat exchanger.

An aspect combinable with any other aspect includes the following features. The temperature sensor is installed at an outlet of the heat exchanger in a pipe configured to flow the heating medium.

An aspect combinable with any other aspect includes the following features. The temperature control valve is installed at an outlet of the heat exchanger in the pipe configured to flow the heating medium.

An aspect combinable with any other aspect includes the following features. The heat exchanger is a tube and shell heat exchanger.

An aspect combinable with any other aspect includes the following features. A pipe is fluidically connected on one end to the cyclonic separator and on another end to the vessel. The pipe is configured to receive the gaseous stream from the cyclonic separator and to flow the received gaseous stream to a gas inlet formed on a wall of the vessel.

An aspect combinable with any other aspect includes the following features. An inlet baffle is disposed inside the vessel in front of the gas inlet formed on the wall of the vessel. The inlet baffle is spatially arranged with reference to the gas inlet to cause the gaseous stream flowed into the vessel to contact the inlet baffle.

An aspect combinable with any other aspect includes the following features. When fluidically connected to the cyclonic separator and the vessel, the pipe has an inverted U shape.

An aspect combinable with any other aspect includes the following features. The cyclonic separator includes an outlet formed at a top of the cyclonic separator to connect to the one end of the pipe.

An aspect combinable with any other aspect includes the following features. The vessel includes a horizontal cylinder and curved side walls. The gas inlet is formed on the vessel top.

An aspect combinable with any other aspect includes the following features. The vessel defines a water retention volume nearer to the vessel bottom than the vessel top, a gas retention volume nearer to the vessel top than the vessel bottom, and an oil retention volume between the water retention volume and the gas retention volume. The gas retention volume and the oil retention volume are separated by an oil interface level. The oil retention volume and the water retention volume are separated by a water interface level. The electrostatic coalescer is disposed entirely between the oil retention level and the water retention level.

An aspect combinable with any other aspect includes the following features. A weir plate is disposed within the vessel to separate the oil retention volume from the water retention volume.

An aspect combinable with any other aspect includes the following features. The weir plate is installed vertically from the vessel bottom.

An aspect combinable with any other aspect includes the following features. The weir plate is dimensioned such that one end of the weir plate is attached to the vessel bottom and another end of the weir plate resides between the oil retention level and the water retention level.

An aspect combinable with any other aspect includes the following features. The weir plate is a first weir plate. A second weir plate is disposed within the vessel offset from the first weir plate such that the second weir plate is attached to the vessel cylinder from the bottom and resides between the first weir plate and an outlet of the electrostatic coalescer. A space between the first weir plate and the second weir plate defines a desalting compartment. An electrical grid is disposed in the desalting compartment. The desalting compartment is configured to receive oil from the oil retention volume. The electrical grid is configured to further separate residual water from the received oil.

An aspect combinable with any other aspect includes the following features. A gas outlet is formed on the vessel top. The gas outlet is configured to flow gas retained in the gas retention volume out of the vessel through the gas outlet.

An aspect combinable with any other aspect includes the following features. A demister plate is disposed within the vessel at the gas outlet. The demister plate is arranged to flow the gas in the gas retention volume through the demister plate before the gas flows out of the vessel through the gas outlet.

An aspect combinable with any other aspect includes the following features. A water outlet is formed at the vessel bottom adjacent the water retention volume. The oil outlet is configured to flow oil retained in the oil retention volume of the vessel through the oil outlet.

An aspect combinable with any other aspect includes the following features. The pipe has an inverted L shape when fluidically connected to the cyclonic separator and the vessel.

An aspect combinable with any other aspect includes the following features. The gas inlet is formed on a side wall of the vessel.

An aspect combinable with any other aspect includes the following features. A power source is disposed outside the vessel and electrically connected to the electrostatic coalescer. Multiple electrical cables are routed from outside the vessel into the vessel. The multiple electrical cables are electrically connected to the power source and the electrostatic coalescer. The multiple electrical cables are configured to transmit electrical power from the transformer to the electrostatic coalescer.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes crude oil demulsification. The crude oil can be demulsified by one or more processes, such as cyclonic separation and electrostatic coalescence. The subject matter described in this disclosure can be implemented, so as to realize one or more of the following advantages. A device including a cyclonic separator and an electrostatic coalescer can be disposed within a storage tank to demulsify the crude oil within the storage tank. The large residence and settling times in storage tanks (for example, residence times ranging from about 30 minutes to about 90 minutes) allow for effective use of the electrostatic coalescer. This is in contrast to conventional gravity separation tanks which, in some cases, experience turbulence and slugging, both of which negatively affect coalescence. Implementation of the subject matter described in this disclosure can allow for smaller downstream processing equipment (such as a wet crude oil dehydrator, heat exchangers, pumps, and vessels), thereby resulting in capital cost savings. The use of the device in the storage tank can allow for the storage tank to be smaller in size in comparison to storage tanks without the device. The use of the device can also result in operating cost savings, as water can be separated from the crude oil upstream of the wet crude oil dehydrator, thereby reducing heating requirements.

Figure 1A:
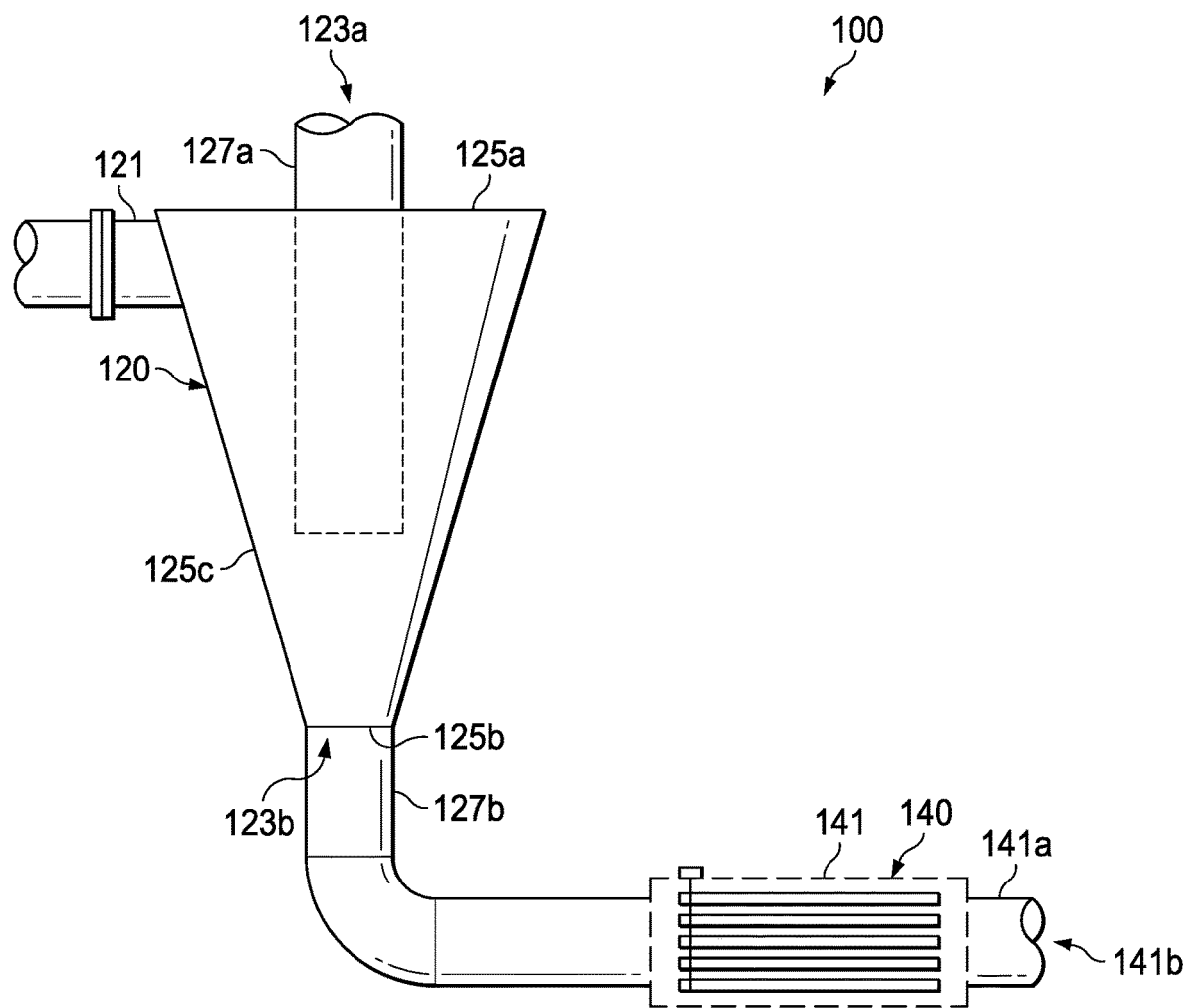
FIG. 1A is a schematic diagram of an example device for fluid separation.

FIG. 1A is a schematic diagram of an example device 100 for fluid separation. The device 100 can be used, for example, to demulsify crude oil. The device includes a cyclonic separator 120 and an electrostatic coalescer 140. The device can be disposed within a storage tank. The storage tank can have a total storage volume in a range of from about 2,000 barrels to about 20,000 barrels. The total storage volume of the storage tank can depend on the desired residence time and on characteristics of the crude oil. The cyclonic separator 120 is configured to receive and separate phases of a multi-phase fluid stream. The cyclonic separator 120 can include a frusto-conical housing. The frusto-conical housing can include a first end 125a, a second end 125b smaller than the first end 125a (with respect to diameter), and a lateral surface 125c between the first end 125a and the second end 125b. The first end 125a, the second end 125b, and the lateral surface 125c define an inner volume of the cyclonic separator 120.

Figure 1B:
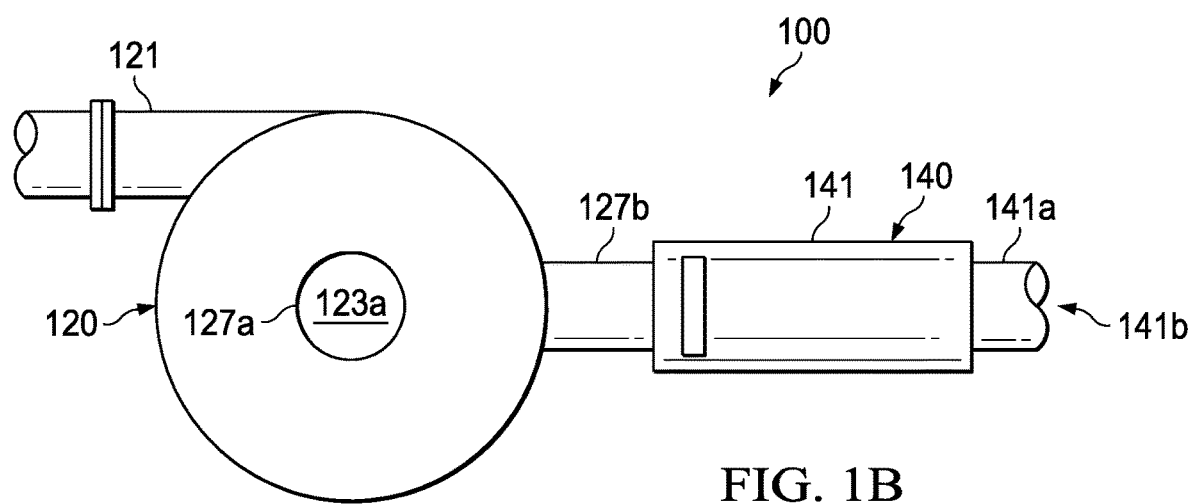
FIG. 1B is a top view of the device of FIG. 1A.

FIG. 1B shows a top view of the device 100 shown in FIG. 1A. The cyclonic separator 120 includes an inlet 121 for receiving and flowing the multi-phase fluid stream into the cyclonic separator 120. The inlet 121 is configured to induce cyclonic flow of the multi-phase fluid stream in the cyclonic separator 120 to separate the multi-phase fluid stream into a gas stream and a liquid stream. As shown, the inlet 121 can be disposed tangentially to a circumference of the cyclonic separator 120. For example, the inlet 121 is disposed tangentially to the lateral surface 125c of the cyclonic separator 120. Such disposition of the inlet 121 can induce the cyclonic flow of the multi-phase fluid stream in the cyclonic separator 120.

Referring back to FIG. 1A, the cyclonic separator 120 includes a first outlet 123a for flowing at least a portion of the gas stream separated from the multi-phase fluid stream. The first outlet 123a can include a tubular 127a penetrating the first end of the conical housing and extending into the inner volume of the cyclonic separator 120. The cyclonic separator 120 includes a second outlet 123b for flowing at least a portion of the liquid stream separated from the multi-phase fluid stream.

The cyclonic flow of the multi-phase fluid stream in the cyclonic separator 120 can cause phases of the multi-phase fluid stream to separate in the cyclonic separator 120. Cyclonic flow can be described as flow of fluid in a substantially helical pattern. The cyclonic flow can cause the heavier (that is, denser) phase(s) of the multi-phase fluid stream to flow along a lateral (that is, circumferential) surface of the cyclonic separator 120, while the lighter (that is, less dense) phase(s) flow closer to the central, longitudinal axis of the cyclonic separator 120. For example, if the multi-phase fluid stream includes gas, oil, and water, then the gas (the lightest phase) can be separated from the other components in the cyclonic separator 120 and flow out of the first outlet 123a, and the oil and water can flow out of the second outlet 123b. The oil and water (the heavier phases) can flow out of the second outlet 123b in the form of an emulsion (that is, water dispersed in oil or vice versa).

The electrostatic coalescer 140 is downstream of and fluidically connected to the second outlet 123b of the cyclonic separator 120. The electrostatic coalescer 140 can be connected to the second outlet 123b by a tubular 127b. The liquid stream flowing out of the second outlet 123b can flow through the tubular 127b to the electrostatic coalescer 140. The electrostatic coalescer 140 is configured to cause coalescence of liquid droplets in the portion of the liquid stream. Coalescence of liquid droplets involves merging of liquid droplets. The electrostatic coalescer 140 can generate an electric field. The generated electric field can cause coalescence of liquid droplets. For example, for an emulsion of water in oil, the electrostatic coalescer 140 can cause the water droplets to coalesce, thereby demulsifying the water and oil. The water present in crude oil typically has salt content. The generated electric field can induce dipole moments in the water droplets and cause the water droplets to be attracted to each other (in other words, cause coalescence of the water droplets).

The electrostatic coalescer 140 can include a housing 141 configured to discharge coalesced liquid droplets to the storage tank (not shown). In some implementations, the housing 141 includes a tubular 141a with an open end 141b for discharging the coalesced droplets to the storage tank.

Figure 1C:
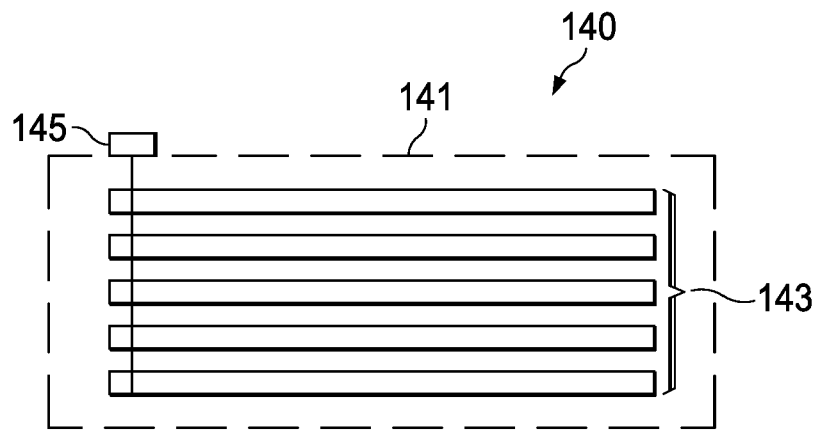
FIG. 1C is a schematic diagram of an example electrostatic coalescer of the device of FIG. 1A.

FIG. 1C illustrates a more detailed view of the electrostatic coalescer 140 that is part of the device 100. The electrostatic coalescer 140 can include multiple electrodes 143 disposed within the housing 141. Although shown in FIG. 1C as including five electrodes 143, the electrostatic coalescer 140 can include fewer electrodes (for example, two, three, or four electrodes) or more electrodes (for example, six electrodes or more than six electrodes). The number of electrodes 143 included in the electrostatic coalescer 140 can depend on one or more factors, such as flow rate of crude oil to the device 100, physical properties of the crude oil flowed to the device 100, composition of the crude oil flowed to the device 100, and temperature of the crude oil flowed to the device 100. The electrostatic coalescer 140 can include a power supply 145 connected to the electrodes 143. The electrodes 143 are configured to produce an electric field in response to receiving power from the power supply 145. In some implementations, the power supply 145 provides power at a voltage in a range of from 400 volts (V) to 16,000V. One or more of the components of the electrostatic coalescer 140 (for example, the power supply 145) can be insulated to avoid short-circuiting and arcing faults.

Figure 1D:
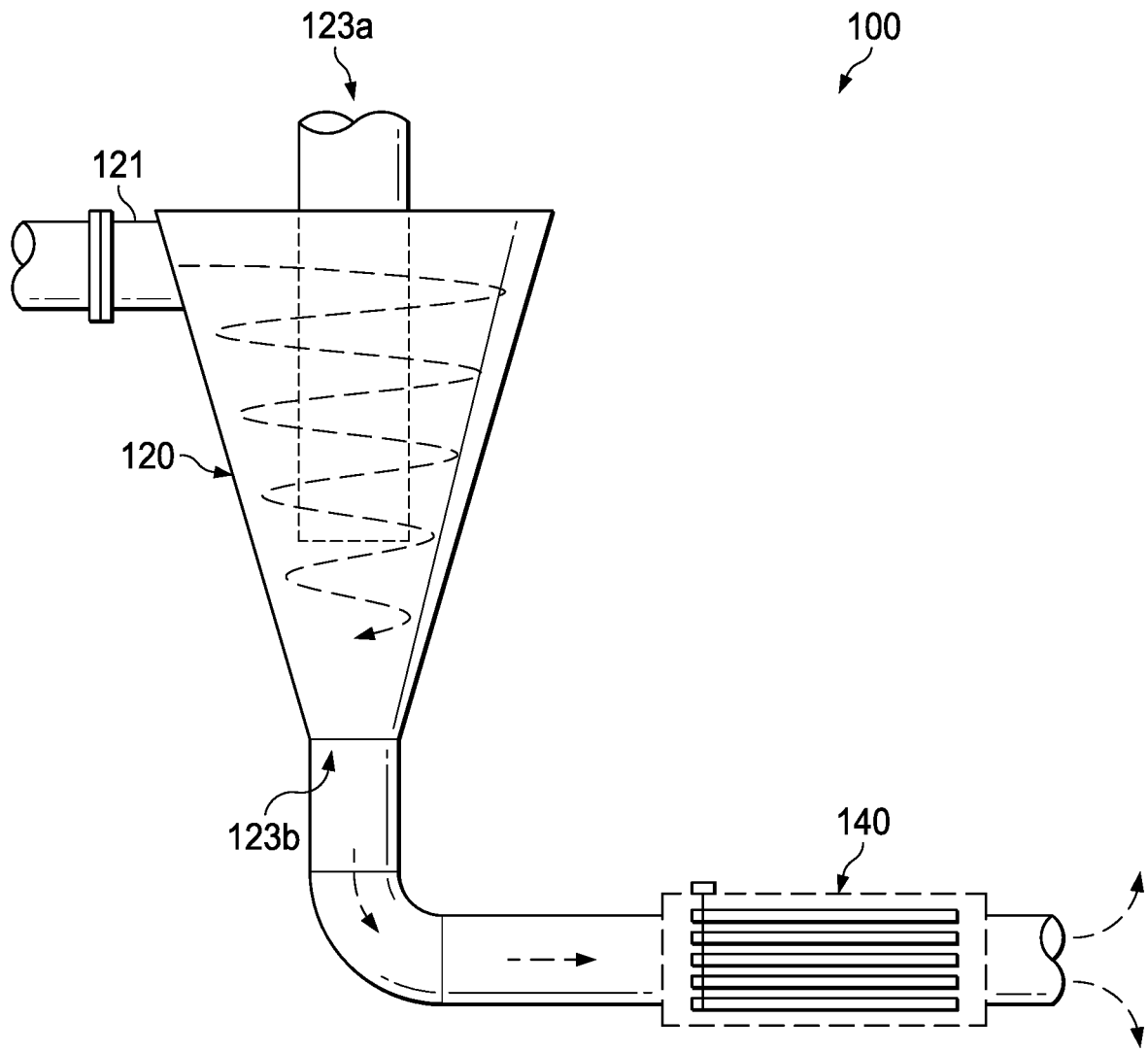
FIG. 1D is a schematic diagram showing an example of flow through the device of FIG. 1A.
Figure 1E:
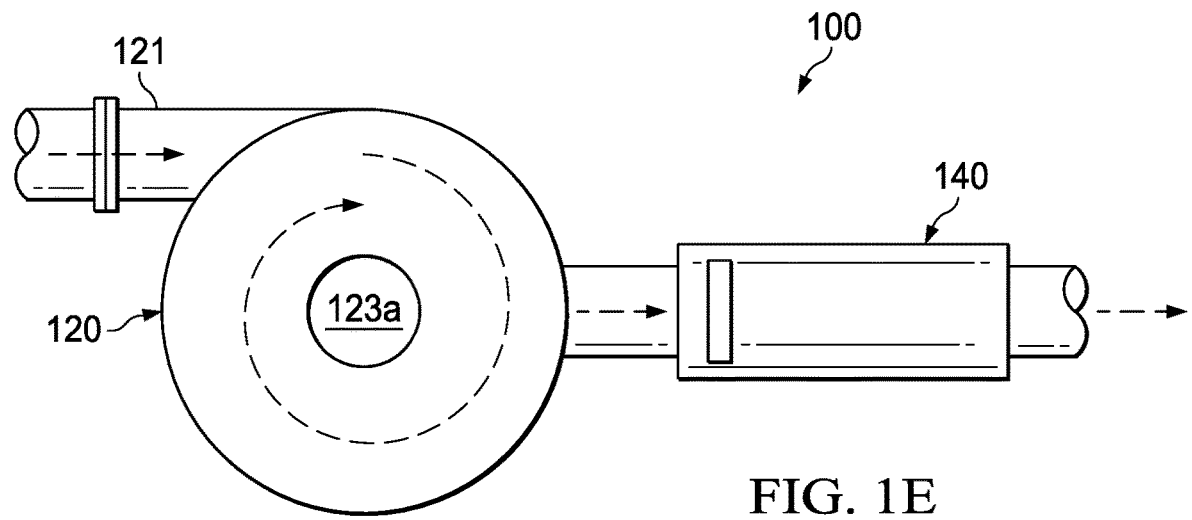
FIG. 1E is a top view showing an example of flow through the device of FIG. 1A.

FIGS. 1D and 1E illustrate an example of the flow of fluid (dotted arrows) through the device 100. A multi-phase fluid stream can be, for example, crude oil including water with dissolved salt. The crude oil can be from, for example, a wellhead or a flow line. The multi-phase fluid stream enters the device 100 via inlet 121. The multi-phase fluid stream flows cyclonically in the cyclonic separator 120. Gas from the multi-phase fluid stream can exit the cyclonic separator 120 through the first outlet 123a. Liquid from the multi-phase fluid stream (for example, water, oil, or a mixture of both) can exit the cyclonic separator 120 through the second outlet 123a and flow to the electrostatic coalescer 140. The electrostatic coalescer 140 can cause demulsification, and the separated liquid phases can discharge from the device 100 and into the storage tank (not shown). The lighter liquid phase (for example, the crude oil) can form a layer on top of the heavier liquid phase (for example, the water including salt).

Figure 2:
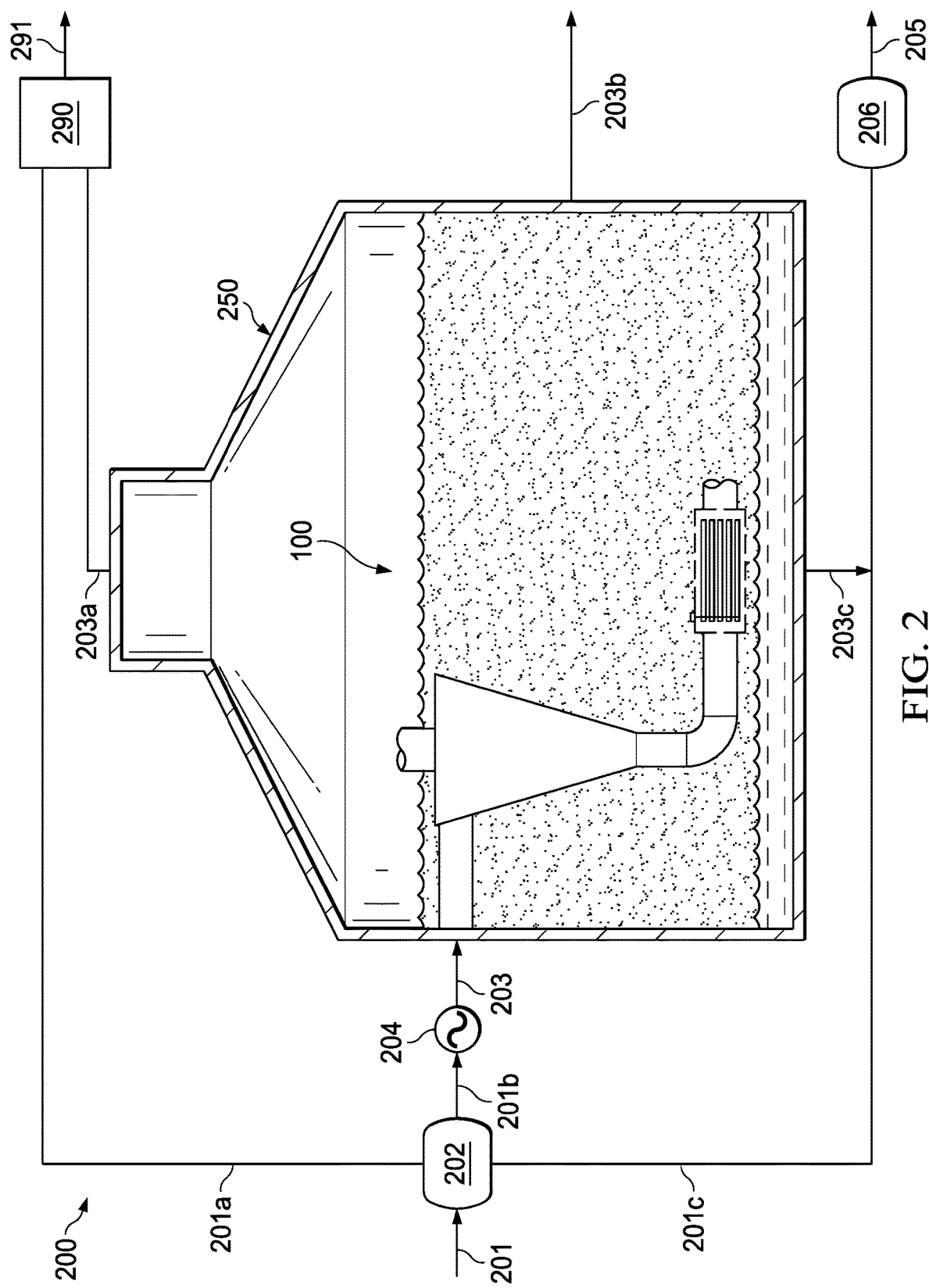
FIG. 2 is a schematic diagram of an example system including the device of FIG. 1A.

FIG. 2 shows a system 200 in which the device 100 is disposed within a storage tank 250. A crude oil stream 201 can include a mixture of crude oil and water. In some cases, the crude oil stream 201 includes entrained gas, dissolved gas, or both. The water can include salt (for example, in the form of dissolved salt in the water). The crude oil stream 201 can be flowed to a separator 202. The separator 202 can be, for example, an American Petroleum Institute (API) oil-water separator. Gas 201a from the crude oil stream 201 (for example, any gas entrained or dissolved in the crude oil stream 201 that can be flashed in separator 202) can be discharged from the separator 202 and flowed to a gas compression unit 290, which can compress and process gas for delivery, for example, to a pipeline, or another downstream processing unit. The lighter liquid phase 201b of the crude oil stream 201 (for example, the crude oil) that is separated in the separator 202 can be flowed to a heater 204. The heavier liquid phase 201c of the crude oil stream 201 (for example, the water including salt) that is separated in the separator 202 can be flowed to another separator 206.

It is noted that the crude oil stream 201 may not completely separate into the gas phase, the lighter liquid phase, and the heavier liquid phase in the separator 202. For example, some gas may still remain in the lighter liquid phase 201b, the heavier liquid phase 201c, or both. For example, some of the heavier liquid (water including salt) may still remain in the lighter liquid phase 201b. Therefore, in some implementations, the lighter liquid phase 201b includes an emulsion of crude oil and water (and in some cases, dissolved gas).

The heater 204 can improve the separation of gas from the lighter liquid phase 201b. In some implementations, the heater 204 causes one or more components in the lighter liquid phase 201b to flash (evaporate). Heating also reduces viscosity of emulsion and lighter liquid phase (oil) which helps the water droplets to coalesce faster. The heated lighter liquid phase 203 can flow to the device 100. Gas from the heated lighter liquid phase 203 can be discharged from the device 100 (for example, from the first outlet 123a of the cyclonic separator 120) and into the vapor space of the storage tank 250. Gas from the storage tank 250 can be flowed to the gas compression unit 290.

The device 100, as described previously, can cause coalescence of water droplets in the oil-water emulsion, thereby promoting separation of the lighter and heavier liquid phases. The lighter phase (oil) can settle as a layer on top of the heavier phase (water) within the storage tank 250. The crude oil from the storage tank 250 can be flowed as a "dry" crude oil stream 203b for delivery, for example, to a pipeline, or another downstream processing unit (such as a refining unit). The water from the storage tank 250 can be flowed as a water stream 203c to the separator 206. The water stream 205 from the separator 206 can be, for example, disposed or flowed to a water treatment unit (not shown). In implementations where the water stream 205 is flowed to a water treatment unit, the water treatment unit can treat the water stream 205, such that it is suitable for disposal or injection into a reservoir.

Figure 3:
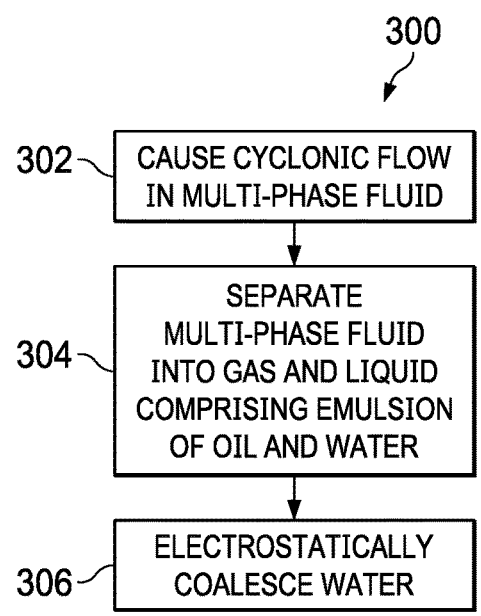
FIG. 3 is a flow chart of an example method for fluid separation.

FIG. 3 is a flow chart for an example method 300, which can be implemented to demulsify crude oil. The method 300 can be implemented with the device 100 disposed within the storage tank 250. At step 302, cyclonic flow is caused in a multi-phase fluid stream through a cyclonic separator (120). The cyclonic flow can be induced by the inlet 121 of the cyclonic separator 120 because the inlet 121 is disposed tangentially to a circumference of the cyclonic separator 120.

At step 304, the multi-phase fluid stream is separated into a gas stream and a liquid stream. The multi-phase fluid stream can be separated in the cyclonic separator 120. The liquid stream can include an emulsion of oil and water. The water can include salt. The gas stream can be discharged from the first outlet 123a of the cyclonic separator 120. The gas stream can be flowed from the cyclonic separator 120 into a vapor space of the storage tank 250 through the first outlet 123a of the cyclonic separator 120. The liquid stream can be discharged from the second outlet 123b of the cyclonic separator 120. The liquid stream can be flowed from the cyclonic separator 120 to the electrostatic coalescer 140. The liquid stream can be flowed from the cyclonic separator 120 to the electrostatic coalescer 140 through the second outlet 123b of the cyclonic separator 120.

At step 306, the water in the emulsion is electrostatically coalesced. That is, the water droplets are coalesced together to promote separation of the oil and the water (demulsification). The water droplets can be coalesced with the electrostatic coalescer 140. Power can be supplied to one or more electrodes 143 to generate an electric field. As described previously, the electric field can induce dipole moments in the water droplets because of the ions in the water (from the dissolved salt). The induced dipole moments causes the water droplets to become attracted to one another, thereby resulting in coalescence of the water droplets. The coalesced water and the oil can be discharged from the electrostatic coalescer 140 to the storage tank 250.

In some implementations, the method 300 includes disposing the device (including the cyclonic separator 120 and the electrostatic coalescer 140) within the storage tank 250 before step 302. In some implementations, the method 300 includes connecting the second outlet 123b of the cyclonic separator 120 to the electrostatic coalescer 140.

Certain aspects of the subject matter described here can be implemented to separate multi-phase fluids into their respective component streams, e.g., liquid stream, gaseous stream. Aspects can be further implemented to process the liquid stream, which includes oil/water emulsions, to break down the emulsion and separate the oil and water. In some implementations, the liquid/gas separation is achieved using a cyclonic separator, as described above. The liquid stream, particularly liquid streams from tight emulsions and viscous crudes, is heated using a heat exchanger. Doing so helps to break the oil/water emulsion to enable coalescence of the small water droplets and settling. The output of the heat exchanger is fed to an electrostatic coalescer which coalesces water and further separates water and oil, as described above. The electrostatic coalescer is placed inside a separator retention vessel into which the gas stream from the cyclonic separator is passed. Gravimetric separation occurs in the separator retention vessel causing the water to settle to the bottom, the gas to rise to the top and the oil to reside in between. The gas can be removed through a gas outlet near a top of the separator retention vessel. Water can be removed through a water outlet near a bottom of the separator retention vessel. Oil can be remoted through an oil outlet in between the gas and water outlets.

In some implementations, the separator retention vessel includes a baffle at the inlet of the gaseous stream coming into the vessel from the cyclonic separator. The baffle helps to separate and remove the small amount of liquid that may be entrained in the bulk gaseous stream coming from the cyclonic separator. The vessel also includes a demister pad at the gas outlet. The vessel further includes a weir plate to further separate the oil and water. Details of these implementations are described in the following paragraphs.

Figure 4:
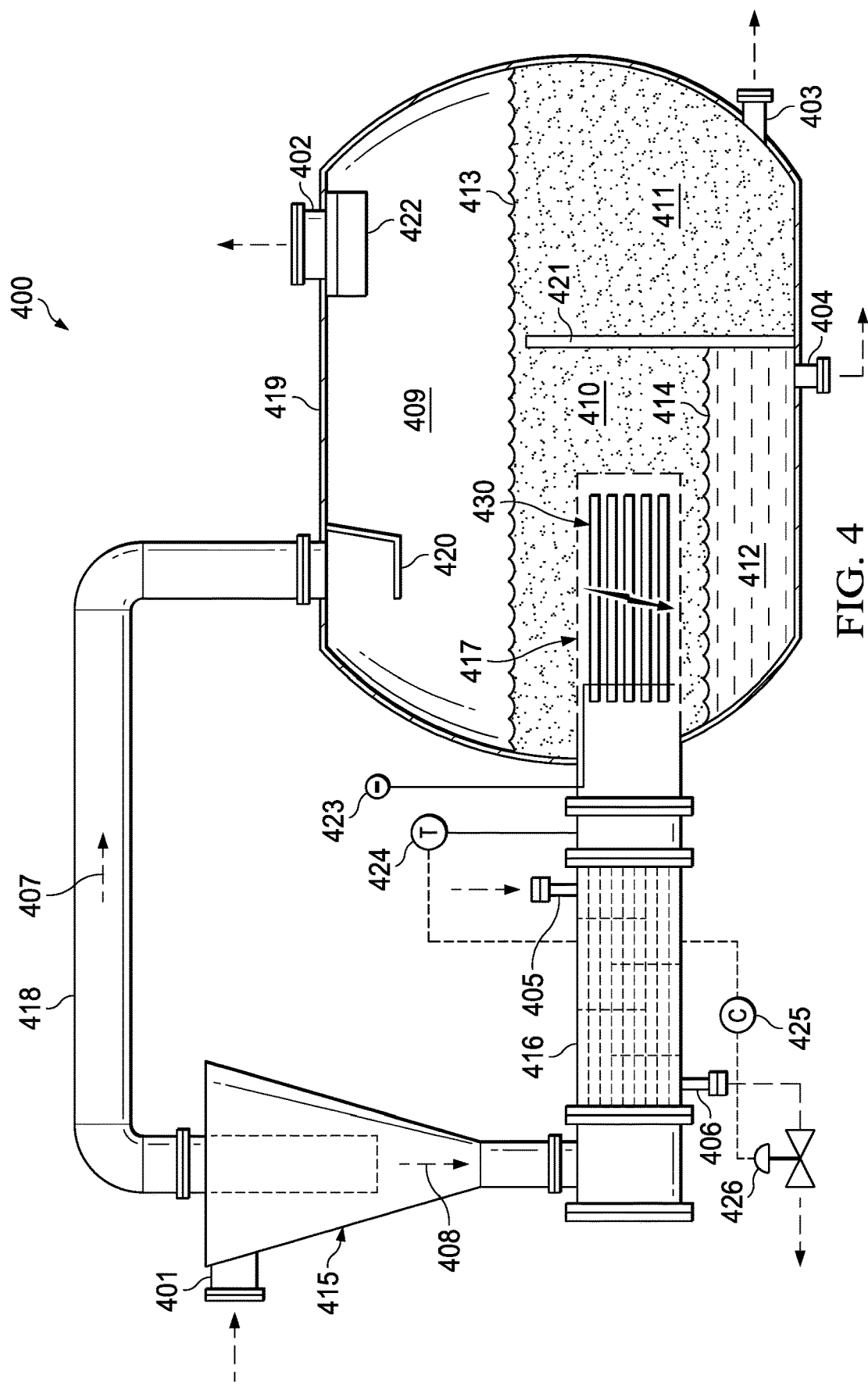
FIG. 4 is a schematic diagram of another implementation of an example system that includes a cyclonic separator and an electrostatic coalescer similar to those shown in FIG. 1A.

FIG. 4 is a schematic diagram of another implementation of an example system 400 that includes a cyclonic separator 415 and an electrostatic coalescer 417 similar to the cyclonic separator 120 and electrostatic coalescer 140, respectively, shown in FIG. 1A. The system 400 includes a 3-phase fluid inlet 401 fluidically connected to the cyclonic separator 415. A multi-phase fluid is flowed through the inlet 401, for example, from a feed pipe (not shown), into the cyclonic separator 415. The inlet 401 is arranged relative to the cyclonic separator 415 in a manner similar to that in which the inlet 121 is arranged relative to the cyclonic separator 120. For example, the inlet 401 is arranged tangentially with respect to the cyclonic separator 415.

With this arrangement, the inlet 401 is configured to induce cyclonic flow of the multi-phase fluid stream in the cyclonic separator 415 to separate the multi-phase fluid stream into a gas stream and a liquid stream. In particular, the tangential flow through the inlet 401 causes the multi-phase fluid to go into a spiral vortex flow pattern causing the liquid stream 408, which includes oil plus water emulsion, to separate from the gaseous stream 407. The separation occurs because of the density difference between the liquid stream 408 and the gaseous stream 407. The gaseous stream 407 rises into a pipe 418 fluidically connected to a top of the cyclonic separator 415 while the liquid stream 408 flows along the walls of the cyclonic separator 415 towards a liquid outlet at a bottom of the cyclonic separator 415.

The pipe 418 that receives the gaseous stream 407 is fluidically connected to a separator retention vessel 419. In some implementations, the pipe 418 includes a vertical portion attached to an inlet to the pipe 418. The inlet to the pipe 418 is coupled to the outlet of the cyclonic separator 415 to receive the gaseous stream 407. The pipe 418 includes a horizontal portion coupled to the vertical portion, and another vertical portion coupled to the horizontal portion. The outlet of the pipe 418 is at an end of the other vertical portion. Thus, when installed, the pipe 418 has the shape of an inverted U. The outlet of the pipe 418 is coupled to an inlet of the separator retention vessel 419.

The separator retention vessel 419 has a volume that is large enough to receive separated streams of the multi-phase fluid that is flowed into the cyclonic separator 415. The volume of the vessel 419 is also large enough to house an electrostatic coalescer 417 similar to the electrostatic coalescer 140 described above with reference to FIG. 1A. In some implementations, the vessel 419 is cylindrical and has a horizontal length and a diameter. In the horizontal orientation, the vessel 419 has a vessel top and a vessel bottom. To connect the vessel top and the vessel bottom, the vessel 419 has hemispherical or elliptical heads at both ends of the horizontal cylindrical shape.

In some implementations, an inlet baffle 420 is installed in the vessel 419 at the gas inlet. The inlet baffle 420 functions to separate and remote any small amount of liquid that may be entrained in the bulk gaseous stream 407 coming from the cyclonic separator 415. When the gaseous stream 407 impacts the inlet baffle 420, a momentum difference between the gas and liquid phases cause any entrained liquid to be separated from the gaseous stream 407 and fall to the bottom of the vessel 419.

A portion of the vessel 419, specifically, a portion nearer the vessel top than the vessel bottom serves as a gas retention volume 419 in which the separated gaseous stream 407 resides. The vessel includes a gas outlet 402 through which the gaseous stream 407 can be vented, for example, either to the atmosphere or into another pipe (not shown) for delivery or further processing. In some implementations, a demister pad 422 is installed inside the vessel 419 covering the gas outlet 402 such that the gaseous stream 407 (or at least a majority of the gaseous stream 407) passes through the demister pad 422 before flowing through the gas outlet 402. The demister pad 422 can include a mesh through which the gaseous stream 407 flows. The demister pad 422 can further remove any entrained liquid droplets from the gaseous stream 407.

Returning to the cyclone separator 415, the liquid stream 408, which includes oil plus water (including free water and emulsion water) and a small amount of gas in liquid flows downward and into a heat exchanger 416. In some implementations, a pipe is fluidically connected to the bottom of the cyclone separator 418. The pipe can have a circumferential inlet that is fluidically coupled to the outlet of the cyclone separator 418 to allow the liquid stream 408 to flow into the pipe. The pipe can be closed on one axial end and have an outlet on the opposite axial end to allow the liquid stream 408 to flow out of the pipe. As described below, the outlet of the pipe is coupled to an inlet to a heat exchanger 416.

The heat exchanger 416 heats the liquid stream 408 to the temperature required to break the oil-water emulsion. The temperature to which the liquid stream 408 needs to be heated is determined from laboratory emulsion tests or operating history or both. In some implementations, the heat exchanger 416 is a shell and tube exchanger that heats the liquid stream 408 by cross exchange of heat from a heating medium. The heating medium can be fed through an inlet 405 and can exit through an outlet 406. The heating medium can be hot thermal oil, steam or any other heating medium available in a hydrocarbon processing plant and for which the heat exchanger 416 is designed. The heat exchanger 416 is constructed in such a way that it allows for easy access for exchanger maintenance/dismantling. In some implementations, the heat exchanger 416 can be connected to the pipe that is connected to the bottom of the cyclone separator 415 such that all of the liquid stream 408 that flows out of the cyclone separator 415 enters the heat exchanger 416.

The temperature of the heating medium is maintained by a temperature control subsystem. The temperature control subsystem includes a temperature sensor 424, which can both sense a temperature and transmit the sensed temperature as a signal. In some implementations, the temperature sensor 424 can sense the temperature of the heating medium. Alternatively, the temperature sensor 424 can sense the temperature of a location on the heat exchanger 416 at which the temperature sensor 424 is installed. In some implementations, the temperature sensor 424 is installed at the outlet 406 or the inlet 405 of the heat exchanger 416.

The temperature sensor 424 transmits the sensed temperature to a temperature controller 425. In some implementations, the temperature controller 425 is implemented as a computer system that includes one or more processors and a computer-readable medium storing instructions executable by the one or more processors to perform operations described here. Alternatively or in addition, the temperature controller 425 can be implemented as processing circuitry, firmware, hardware, software or a combination of them. In some implementations, the temperature controller 425 stores a reference temperature (or a reference temperature range), for example, in the computer-readable medium. Upon receiving the temperature sensed by the temperature sensor 424, the temperature controller 425 compares the received temperature with the reference temperature (or reference temperature range). If the received temperature is less than the reference temperature (or reference temperature range), then more heat needs to be supplied to the heat exchanger 416. If the received temperature is more than the reference temperature (or reference temperature range), then less heat needs to be supplied to the heat exchanger 416.

The temperature controller 425 is operatively connected to a temperature control valve 426. The temperature control valve 426 can be installed in the flow path of the heating medium. The temperature controller 425 can transmit instructions to the temperature control valve 426 to open or close the temperature control valve 426. In this context, open/close means partially open/close to varying degrees ranging from fully open to fully closed. If the temperature controller 425 determines that more heat needs to be supplied to the heat exchanger 416, the temperature controller 425 can transmit an instruction to cause the temperature control valve 426 to open. Conversely, if the temperature controller 425 determines that less heat needs to be supplied to the heat exchanger 416, the temperature controller 425 can transmit an instruction to cause the temperature control valve 426 to close. In this manner, the temperature control subsystem, which includes the temperature sensor 424, the temperature controller 425 and the temperature control valve 426, can maintain a temperature of the heat exchanger 416.

As described above, the heat exchanger 416 heats the liquid stream 408 to a level sufficient to separate the oil and water in the emulsion included in the liquid stream 408. The heated liquid stream 408 is flowed from the heat exchanger 416 into the electrostatic coalescer 417. The coalescer 417 is mounted inside the separator retention vessel 419. In some implementations, the coalescer 417 is mounted nearer the vessel bottom of the vessel 419 than the vessel top. The position of the coalescer 417 can be selected such that the coalescer 417 resides in an emulsion layer 410 within the vessel 419 and is surrounded by the emulsion that flows into the vessel 419.

The coalescer 417 has multiple insulated electrostatic electrodes parallel to the flow path. A power source 423, e.g., a transformer or other power source, supplies power, for example, AC power, to the electrodes by passing current through the insulated electrical cables. In response to receiving the power, small water droplets in the oil continuous phase, which are stabilized due to emulsion forces are attracted towards electrical grids in the coalescer 417 due to the polarity of the water droplets. The attraction causes aggregation of smaller water droplets and coalescence into larger droplets. In this manner, the water gets separated from the oil as the liquid stream 408 exits the coalescer 417. The water falls to a water retention volume 412 within the separator retention vessel 419, while the oil exits the coalescer 417 from the top. The water retention volume 412 is at the bottom of the vessel 419. Oil that has separated from the water rises above the water, and the gas resides above the oil. The three streams are separated by two interface levels—a water interface level 414 that separates the oil and the water, and an oil interface level 413 that separates the oil and the gas. The electrostatic coalescer 417 is installed within the vessel 419 to reside between the water interface level 414 and the oil interface level 413.

Over time, any oil that fell to the water retention volume 412 also rises above the water interface level 414 and joins the oil. Similarly, any gas that is trapped in the oil or in the water rises above the oil interface level 413 and joins the gas in the gas retention volume 409.

Dehydrated oil can be collected in an oil retention volume 411 formed within the separator 409. To form the oil retention volume 411, a weir plate 421 is installed vertically from the bottom of the vessel 419. Also, the weir plate 421 is installed away from the exit of the electrostatic coalesce 417 the outlet of the coalescer 417 is in between the inlet of the coalescer 417 within the separator 419 and the weir plate 421. When the weir plate 421 is installed as described here, the weir plate 421 extends from the bottom of the water retention volume 412 towards but not all the way to the oil interface level 413. The height of the weir plate 421 is chosen such that the water interface level 414 is below the top of the weir plate 421 whereas the oil interface level 413 is above the top of the weir plate 421. Consequently, any fluid that exits the coalescer 417 falls downward into the water retention volume 412 and not into the oil retention volume 411. As the oil rises above the water, the dehydrated oil flows over the top of the weir plate 421 into the oil retention volume 411.

The separator 419 defines a water outlet 404, for example, in a vessel bottom or a side wall of the separator 419 at a location next to the water retention volume 412. The water in the water retention volume 412 can be removed from the separator 419 through the water outlet 404. The separator 419 defines an oil outlet 403, for example, in a side wall or a vessel bottom of the separator 419 at a location next to the oil retention volume 411. The oil in the oil retention volume 411 can be removed from the separator 419 through the oil outlet 403.

Figure 5:
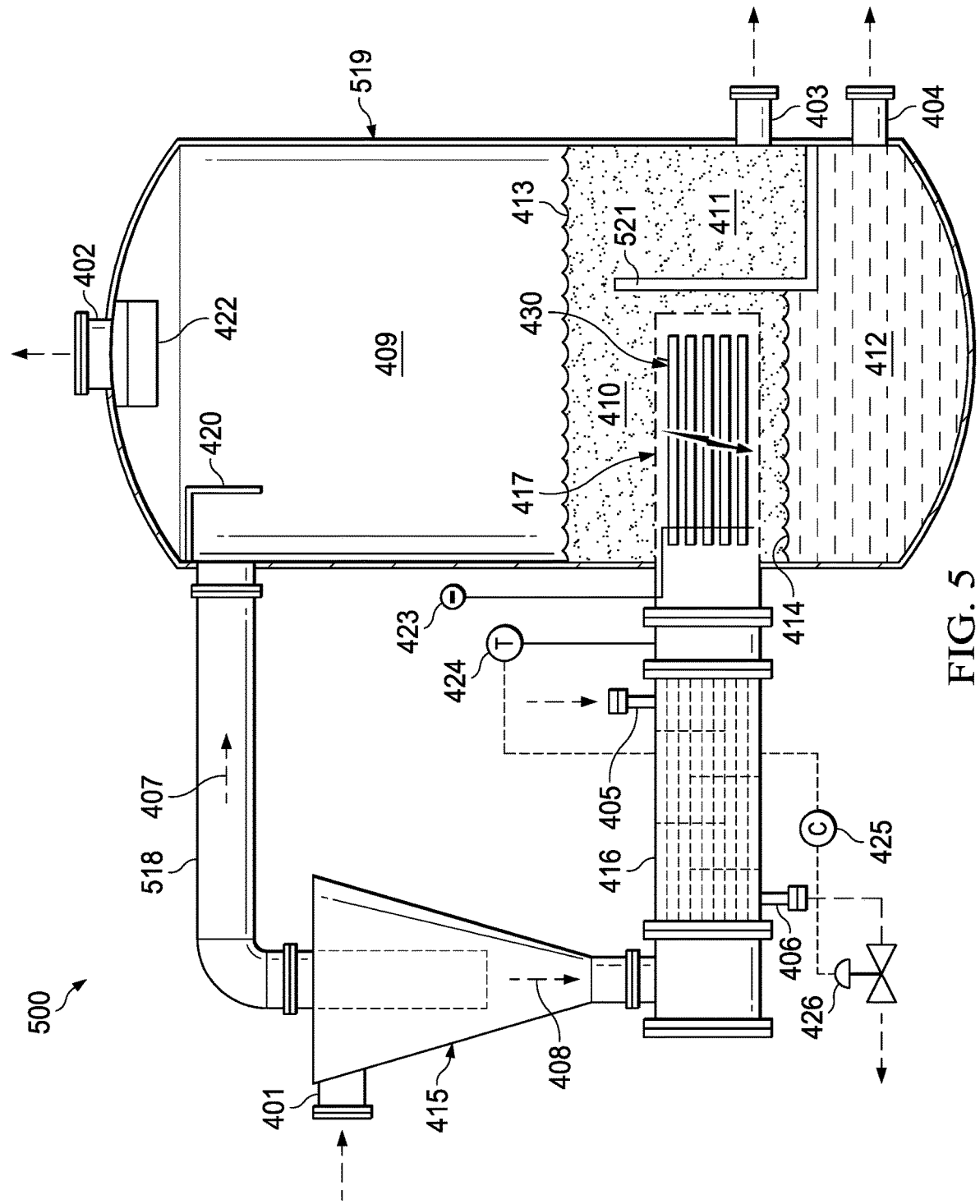
FIG. 5 is a schematic diagram of another implementation of an example system that includes a cyclonic separator and an electrostatic coalescer similar to those shown in FIG. 1A.

FIG. 5 is a schematic diagram of another implementation of an example system 500 that includes a cyclonic separator 415 and an electrostatic coalescer 417 similar to the cyclonic separator 120 and electrostatic coalescer 140, respectively, shown in FIG. 1A. In the implementation described with reference to FIG. 4, the pipe 418, when installed, had the shape of an inverted U. In the implementation described with reference to FIG. 5, the corresponding pipe 518 has the shape of an inverted L or an inverted number 7. The pipe 518 includes a vertical portion attached to an inlet of the pipe 518. The pipe 518 includes a horizontal portion having one end coupled to the vertical portion. The outlet of the pipe 518 is at another end of the horizontal portion. The outlet of the pipe 518 is coupled to an inlet of the separator retention vessel 519. Whereas the inlet of the separator retention vessel 419 was formed on the vessel top of the vessel 419 in the implementation described with reference to FIG. 4, the inlet of the separator retention vessel 519 described with reference to FIG. 5 is formed on a side wall of the vessel 519. The position of the inlet baffle 420 inside the vessel 519 can be modified based on the inlet of the vessel 519.

Further, in the implementation described with reference to FIG. 4, vessel 419 can be a horizontal cylinder with the side wall curved outward from the inner volume defined by the separator 419. In the implementation described with reference to FIG. 5, the same separator 519 can be changed from a horizontal orientation to a vertical orientation. In such an arrangement, a horizontal footprint of the system 500 reduces but a vertical footprint of the system 500 increases relative to the system 400. Also, in the system 500, the weir plate 521 can be attached to the curved side wall (rather than the curved bottom wall) and can include two portions attached at 90° to each other. An end of one of the portions can be attached to the side wall of the separator 519 to be perpendicular to the side wall of the separator 519, and the other portion can be attached to that portion to be parallel to the side wall of the separator 519. The top of the weir plate 521 can be positioned above the water interface level 414 and below the oil interface level 413 similar to the implementation described with reference to FIG. 5.

Figure 6:
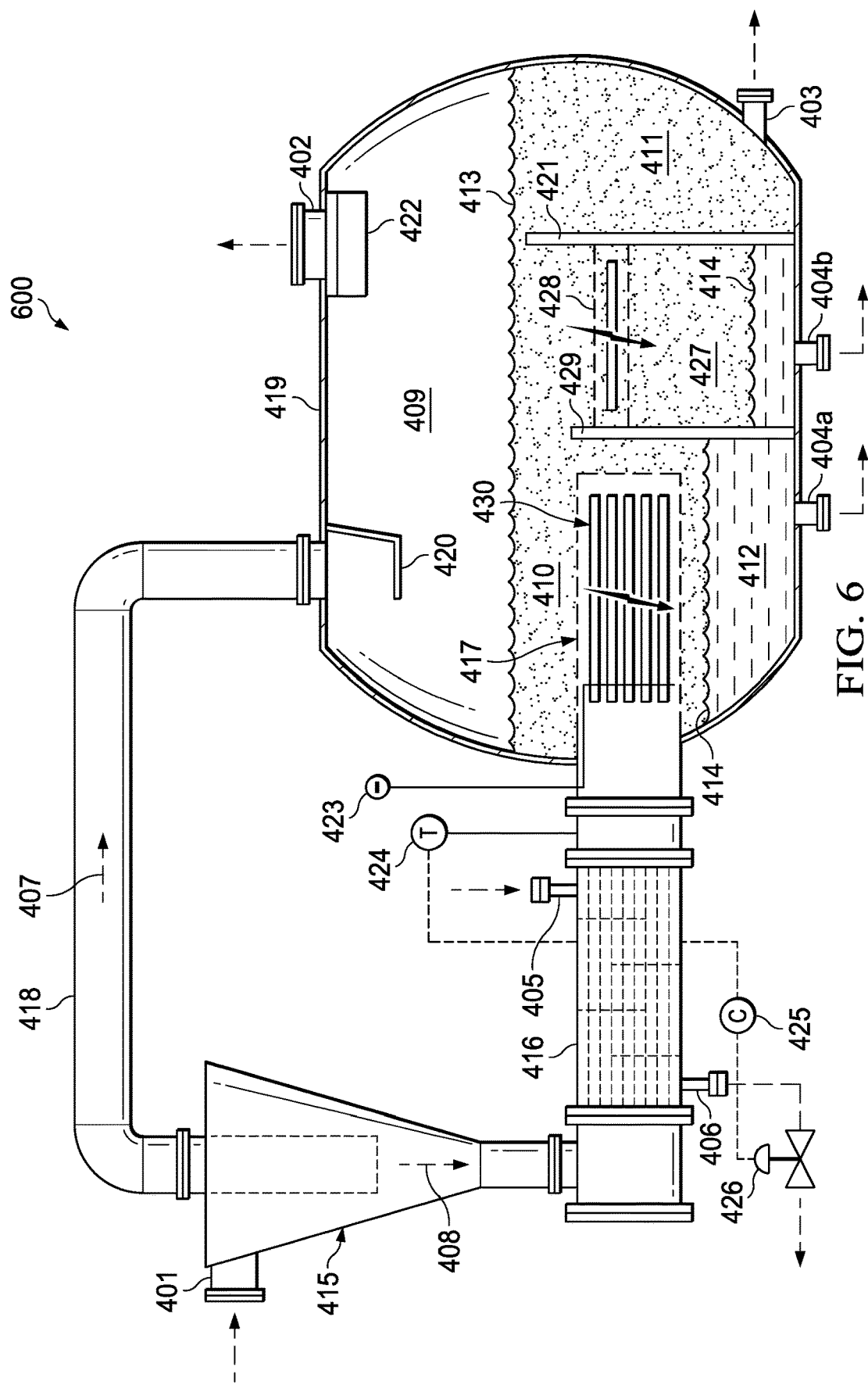
FIG. 6 is a schematic diagram of another implementation of an example system that includes a cyclonic separator and an electrostatic coalescer similar to those shown in FIG. 1A.

FIG. 6 is a schematic diagram of another implementation of an example system 600 that includes a cyclonic separator and an electrostatic coalescer similar to those shown in FIG. 1A. The system 600 includes all the features of system 400 described with reference to FIG. 4. In addition, the system 600 includes a secondary desalting compartment 427 and electric grids 428 to further separate oil exiting the electrostatic coalescer 417. The system 600 includes two weir plates—421 and 429. The weir plate 421 separates the oil retention volume 411 from the remainder of the separator 419. The weir plate 429 is positioned between an outlet of the coalescer 417 and the weir plate 421, and defines a secondary desalting compartment 427 in which additional electrical separation of oil and water is implemented. To do so, electrical grids 428 are disposed in the secondary desalting compartment 427, for example, mounted to either or both of the weir plates 421 and 429. Oil exiting the coalescer 417 flows into the secondary desalting compartment 427, where the oil is subjected to further separation by operating the electrical grids 428.

The grids are composed of multiple electrodes which distribute the power transmitted from the transformer which supplies power from external source to create the high voltage field in the vessel. The transformer can be mounted either on top of the vessel or on any external structure adjacent to the vessel which house the grids. The purpose of the electrical grid is to generate electric field between its electrode in the desalter which will help to coalesce the water droplets and dehydrate (demulsify) the water/oil emulsion. The size of the transformer and the spacing between the grids are factors that determine how strong the electric field can be generated for coalescing the water.

Any residual water in the oil that flowed into the secondary desalting compartment 427 accumulates at the bottom of the compartment 428, whereas any residual gas rises to the gas retention volume 409. The oil then flows from the compartment 428 to the oil retention volume 411. The separator includes two water outlets—404a, 404b—one immediately below the water retention volume 414 below the coalescer 417 and the other in the compartment 428. The water can be remoted from the separator 419 through the two water outlets.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" means a deviation or allowance of up to 10 percent (%) and any variation from a mentioned value is within the tolerance limits of any machinery used to manufacture the part. Likewise, "about" and "substantially" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A system comprising:
   a vessel;
   a cyclonic separator disposed outside the vessel, the cyclonic separator configured to receive and separate phases of a multi-phase fluid stream, the cyclonic separator configured to induce cyclonic flow of the multi-phase fluid stream to separate the multi-phase fluid stream into a gaseous stream and a liquid stream comprising a first liquid phase and a second liquid phase, the cyclonic separator configured to discharge at least a portion of the gaseous stream and at least a portion of the liquid stream;
   a heat exchanger fluidically connected to the cyclonic separator, the heat exchanger disposed outside the vessel, the heat exchanger configured to receive the liquid stream, the heat exchanger configured to heat the liquid stream by exchanging heat with a heating medium flowed through the heat exchanger;
   an electrostatic coalescer fluidically connected to the heat exchanger, the electrostatic coalescer disposed inside the vessel, the electrostatic coalescer configured to receive the liquid stream heated by the heat exchanger, the electrostatic coalescer configured to demulsify the liquid stream by causing coalescence of liquid droplets of one of the first or second liquid phases; and
   a pipe fluidically connected on one end to the cyclonic separator and fluidically connected on another end to the vessel, the pipe configured to receive the gaseous stream from the cyclonic separator and to flow the received gaseous stream to a gas inlet formed on a wall of the vessel.

2. The system of claim 1, further comprising a temperature control subsystem connected to the heat exchanger and disposed outside the vessel, the temperature control subsystem comprising:
   a temperature sensor installed in a flow path of the heating medium, the temperature sensor configured to sense a temperature of the heating medium and to transmit the sensed temperature;
   a temperature controller coupled to the temperature sensor, the temperature controller configured to:
      receive the sensed temperature from the temperature sensor,
      compare the sensed temperature with a reference temperature, and
      based on a result of the comparing, cause operation of a temperature control valve that is disposed in the flow path of the heating medium and is configured to control a quantity of the heating medium flowed through the heat exchanger.

3. The system of claim 2, wherein the temperature sensor is installed at an outlet of the heat exchanger in a pipe configured to flow the heating medium.

4. The system of claim 3, wherein the temperature control valve is installed at an outlet of the heat exchanger in the pipe configured to flow the heating medium.

5. The system of claim 1, wherein the heat exchanger is a tube and shell heat exchanger.

6. The system of claim 1, further comprising an inlet baffle disposed inside the vessel in front of the gas inlet formed on the wall of the vessel, wherein the inlet baffle is spatially arranged with reference to the gas inlet to cause the gaseous stream flowed into the vessel to contact the inlet baffle.

7. The system of claim 1, wherein, when fluidically connected to the cyclonic separator and the vessel, the pipe has an inverted U shape.

8. The system of claim 1, wherein the cyclonic separator comprises an outlet formed at a top of the cyclonic separator to connect to the one end of the pipe.

9. The system of claim 8, wherein the vessel comprises:
   a horizontal cylinder; and
   curved side walls, wherein the gas inlet is formed on the vessel top.

10. The system of claim 9, wherein the vessel defines:
    a water retention volume nearer to the vessel bottom than the vessel top;
    a gas retention volume nearer to the vessel top than the vessel bottom; and
    an oil retention volume between the water retention volume and the gas retention volume, wherein the gas retention volume and the oil retention volume are separated by an oil interface level, wherein the oil retention volume and the water retention volume are separated by a water interface level, wherein the electrostatic coalescer is disposed entirely between the oil retention level and the water retention level.

11. The system of claim 10, further comprising a weir plate disposed within the vessel to separate the oil retention volume from the water retention volume.

12. The system of claim 11, wherein the weir plate is installed vertically from the vessel bottom.

13. The system of claim 12, wherein the weir plate is dimensioned such that one end of the weir plate is attached to the vessel bottom, and another end of the weir plate resides between the oil retention level and the water retention level.

14. The system of claim 13, wherein the weir plate is a first weir plate, wherein the system comprises:
    a second weir plate disposed within the vessel offset from the first weir plate such that the second weir plate is attached to the vessel cylinder from the bottom and resides between the first weir plate and an outlet of the electrostatic coalescer, wherein a space between the first weir plate and the second weir plate defines a desalting compartment; and
    an electrical grid disposed in the desalting compartment, the desalting compartment configured to receive oil from the oil retention volume, wherein the electrical grid is configured to further separate residual water from the received oil.

15. The system of claim 10, further comprising a gas outlet formed on the vessel top, the gas outlet configured to flow gas retained in the gas retention volume out of the vessel through the gas outlet.

16. The system of claim 15, further comprising a demister plate disposed within the vessel at the gas outlet, the demister plate arranged to flow the gas in the gas retention volume through the demister plate before the gas flows out of the vessel through the gas outlet.

17. The system of claim 10, further comprising a water outlet formed at the vessel bottom adjacent the water retention volume, the water outlet configured to flow water retained in the water retention volume out of the vessel through the water outlet.

18. The system of claim 10, further comprising an oil outlet formed in the side wall adjacent the oil retention volume, the oil outlet configured to flow oil retained in the oil retention volume of the vessel through the oil outlet.

19. The system of claim 1, wherein, when fluidically connected to the cyclonic separator and the vessel, the pipe has an inverted L shape.

20. The system of claim 19, wherein the gas inlet is formed on a side wall of the vessel.

21. The system of claim 1, further comprising:
a power source disposed outside the vessel and electrically connected to the electrostatic coalescer; and
a plurality of electrical cables routed from outside the vessel into the vessel, the plurality of electrical cables electrically connected to the power source and the electrostatic coalescer, the plurality of electrical cables configured to transmit electrical power from the transformer to the electrostatic coalescer.

* * * * *